US008782536B2

(12) United States Patent
Tu

(10) Patent No.: US 8,782,536 B2
(45) Date of Patent: Jul. 15, 2014

(54) IMAGE-BASED INSTANT MESSAGING SYSTEM FOR PROVIDING EXPRESSIONS OF EMOTIONS

(75) Inventor: Giant Tu, Taipei (TW)

(73) Assignee: Nuance Communications, Inc., Burlington, MA (US)

( * ) Notice: Subject to any disclaimer, the term of this patent is extended or adjusted under 35 U.S.C. 154(b) by 1436 days.

(21) Appl. No.: 11/959,567

(22) Filed: Dec. 19, 2007

(65) Prior Publication Data

US 2008/0163074 A1 Jul. 3, 2008

(30) Foreign Application Priority Data

Dec. 29, 2006 (CN) .................................. 095150120

(51) Int. Cl.
*G06F 3/00* (2006.01)

(52) U.S. Cl.
USPC .......................................................... 715/758

(58) Field of Classification Search
CPC ................................ G06F 3/048; G10L 13/08
USPC .......................................................... 715/758
See application file for complete search history.

(56) References Cited

U.S. PATENT DOCUMENTS

| | | | | |
|---|---|---|---|---|
| 5,737,488 | A * | 4/1998 | Iso | 704/256 |
| 5,884,267 | A | 3/1999 | Goldenthal et al. | |
| 6,112,177 | A | 8/2000 | Cosatto et al. | |
| 6,250,928 | B1 * | 6/2001 | Poggio et al. | 434/185 |
| 6,539,354 | B1 | 3/2003 | Sutton et al. | |
| 6,606,594 | B1 * | 8/2003 | Sejnoha et al. | 704/250 |
| 6,919,892 | B1 * | 7/2005 | Cheiky et al. | 345/473 |
| 6,947,893 | B1 * | 9/2005 | Iwaki et al. | 704/258 |
| 7,027,054 | B1 * | 4/2006 | Cheiky et al. | 345/473 |
| 7,035,803 | B1 * | 4/2006 | Ostermann et al. | 704/260 |
| 7,103,548 | B2 * | 9/2006 | Squibbs et al. | 704/260 |
| 2002/0024519 | A1 * | 2/2002 | Park | 345/474 |
| 2002/0194006 | A1 | 12/2002 | Challapali | |
| 2003/0120492 | A1 | 6/2003 | Kim et al. | |
| 2004/0107106 | A1 | 6/2004 | Margaliot et al. | |
| 2006/0019636 | A1 * | 1/2006 | Guglielmi et al. | 455/412.1 |
| 2006/0136226 | A1 | 6/2006 | Emam | |
| 2007/0208569 | A1 * | 9/2007 | Subramanian et al. | 704/270 |
| 2009/0125312 | A1 * | 5/2009 | Hwang et al. | 704/276 |

OTHER PUBLICATIONS

Taiwanese Office Action from Taiwan Application No. 095150120.
Decision of Rejection dated Aug. 23, 2011 from Taiwanese Patent Application Serial No. 095150120.

* cited by examiner

*Primary Examiner* — Boris Pesin
*Assistant Examiner* — Angie Badawi
(74) *Attorney, Agent, or Firm* — Wolf, Greenfield & Sacks, P.C.

(57) ABSTRACT

Emotions can be expressed in the user interface for an instant messaging system based on the content of a received text message. The received text message is analyzed using a text-to-speech engine to generate phoneme data and wave data based on the text content. Emotion tags embedded in the message by the sender are also detected. Each emotion tag indicates the sender's intent to change the emotion being conveyed in the message. A mapping table is used to map phoneme data to viseme data. The number of face/lip frames required to represent viseme data is determined based on at least the length of the associated wave data. The required number of face/lip frames is retrieved from a stored set of such frames and used in generating an animation. The retrieved face/lip frames and associated wave data are presented in the user interface as synchronized audio/video data.

14 Claims, 7 Drawing Sheets

IMAGE-BASED INSTANT MESSAGING SYSTEM FOR PROVIDING EXPRESSIONS OF EMOTIONS

BACKGROUND OF THE INVENTION

The present invention generally relates to text-to-visual speech (TTVS), and more particularly, to a messaging system for displaying emotions (e.g., happiness or anger) in an image of a face.

With the advent of the internet and other networks, users at remote locations are able to communicate with each other in various forms, such as on-line chat (e.g. chat rooms) and e-mail. On-line chat is particularly useful in many situations since it allows users to communicate over a network in real-time by typing text messages to each other in a chat window that shows at least the last few messages from all participating users.

In early instant messaging systems, users personalized text messages by typing in “emoticons” to convey emotions. Examples of commonly used emoticons that can be produced using a standard QWERTY keyboard include :-) representing a smiling face, :-< representing sadness, :-( representing dismay or anger, and >:-< representing extreme anger. Unfortunately, even with the widespread use of such typed emoticons, on-line chat tends to be impersonal, and requires the user read “between the lines” of a message in order to understand the emotional state of the sender. Newer instant messaging systems allow users to access the library of icons that provided expressions of emotions; for example, ☹ for dismay or anger).

Mobile devices, such as cell phones with text messaging capabilities or personal digital assistants with communications capabilities, are becoming more and more popular for electronic chats. Text-based chatting using such mobile devices is difficult, however, because the display screens in such devices are typically too small to display complex messages, such as messages including a number of emoticons in addition to the typed text. Users are forced to restrain their use of emoticons in order to dedicate much of the screen to text. With currently available systems, if two users want to clearly convey emotional states during an electronic chat, the users must resort to video technology by using Web cameras or other networked video cameras. Chats conducted using such video technology consume a significant amount of network bandwidth and require the use of significant data processing resources.

“Text to visual speech” systems utilize a keyboard or an equivalent character input device to enter text, convert the text into a spoken message, and broadcast the spoken message along with an animated face image. One of the limitations of existing text-to-visual speech systems is that, because the author of the message is simply typing in text, the output (i.e., the animated face and spoken message) may not convey the emotions the sender would like to convey.

BRIEF SUMMARY OF THE INVENTION

The present invention may be embodied as a method of providing an animated image that expresses emotions based on the content of a received text message. The received text message is analyzed to generate phoneme data and wave data based on the text content. Generated phoneme data is mapped to viseme data representing a particular emotion. A needed number of face/lip frames associated with the viseme data is calculated based on the length of the generated wave data. The calculated number of frames is retrieved to generate an animation that is associated with the generated wave data.

The present invention may also be implemented as a computer program product for providing an animated image that expresses emotions based on the content of a received text message. The computer program product includes a computer usable media embodying computer usable program code configured to analyze the received text message to generate phoneme data and wave data based on the text content, to map generated phoneme data to viseme data representing a particular emotion, to calculate a needed number of face/lip frames associated with the viseme data based on the length of the generated wave data, and to retrieve the calculated number of face/lip frames to generate an animation that is associated with the generated wave data.

The present invention may also be implemented as a visual speech system. The system includes a text-to-speech engine for analyzing a received text message to generate phoneme data and wave data based on the text content. Mapping logic is used to map generated phoneme data to viseme data representing a particular emotion. System logic exists for calculating a needed number of face/lip frames associated with the viseme data based on the length of the generated wave data. Retrieval control logic is used to retrieve the calculated number of face/lip frames to generate an animation that is associated with the generated wave data.

DETAILED DESCRIPTION OF THE INVENTION

Figure 1:
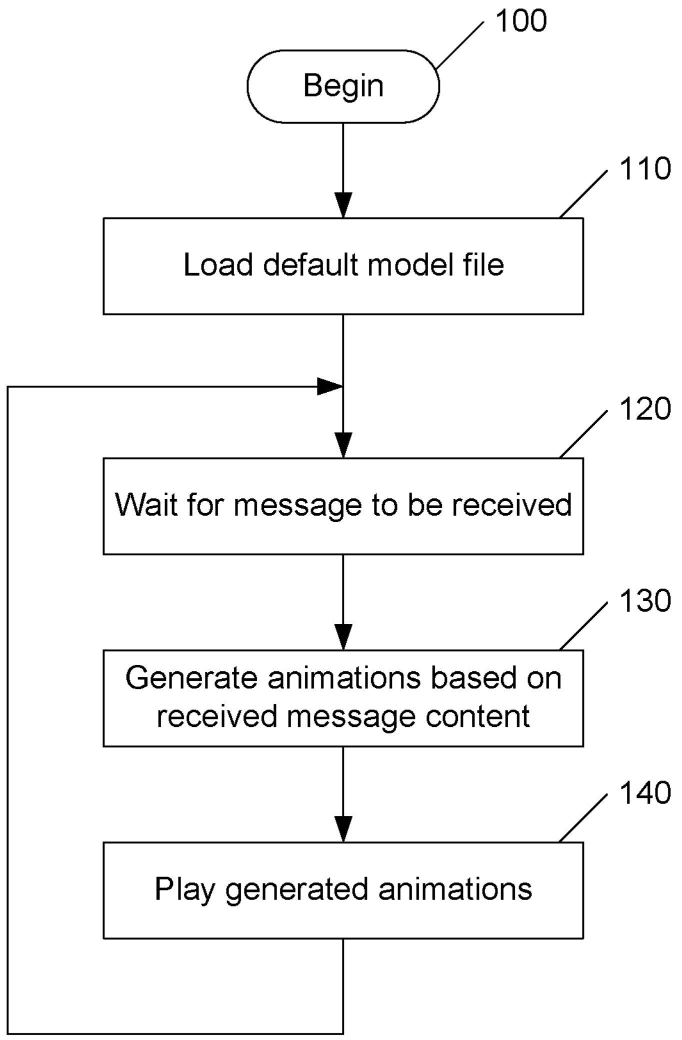
FIG. 1 is a flowchart of an image-based chat process implementing the present invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The following terms will be used in the detailed description:

Phoneme: a basic unit of speech in the acoustic domain.

viseme: a basic unit of speech in the visual domain (i.e. visual speech) that corresponds to a phoneme. Phonemes and visemes do not share a one-to-one correspondence; often, several phonemes share the same viseme. In other words, several phonemes may result in the same facial image, such as /k/, /g/, /η/, (viseme: /k/), or /□/, /□/, /□/, /□/ (viseme: /ch/). Conversely, while some phonemes may be hard to distinguish acoustically, such as phonemes /p/, /m/, /b/, those phonemes may be associated with visually distinctive visemes because there are significant differences between mouth shapes when pronouncing these phonemes.

Phoneme bigram table: 2 dimension (2-D) matrix which contains the bigram value of all phonemes. This bigram value represents the frequency of the phoneme combination (current phoneme and preceding phoneme). The table is generally generated and accomplished via the corpus analysis. The value range is from 0.1 to 1. The most common combination, the value is "1", thus "1" means the phoneme grouping is the most popular. With this information, the smoothness of face/lip animations can be optimized.

According to the present invention, three components are needed: a Text-to-Speech (TTL) engine, an Instant Messaging (IM) system and an animation generation component. The TTS engine is used to generate wave data for each received message and to obtain the corresponding phoneme data for the message. The wave data is required for audio output. The phoneme data is required for the animations provided as a visual output.

Figure 2:
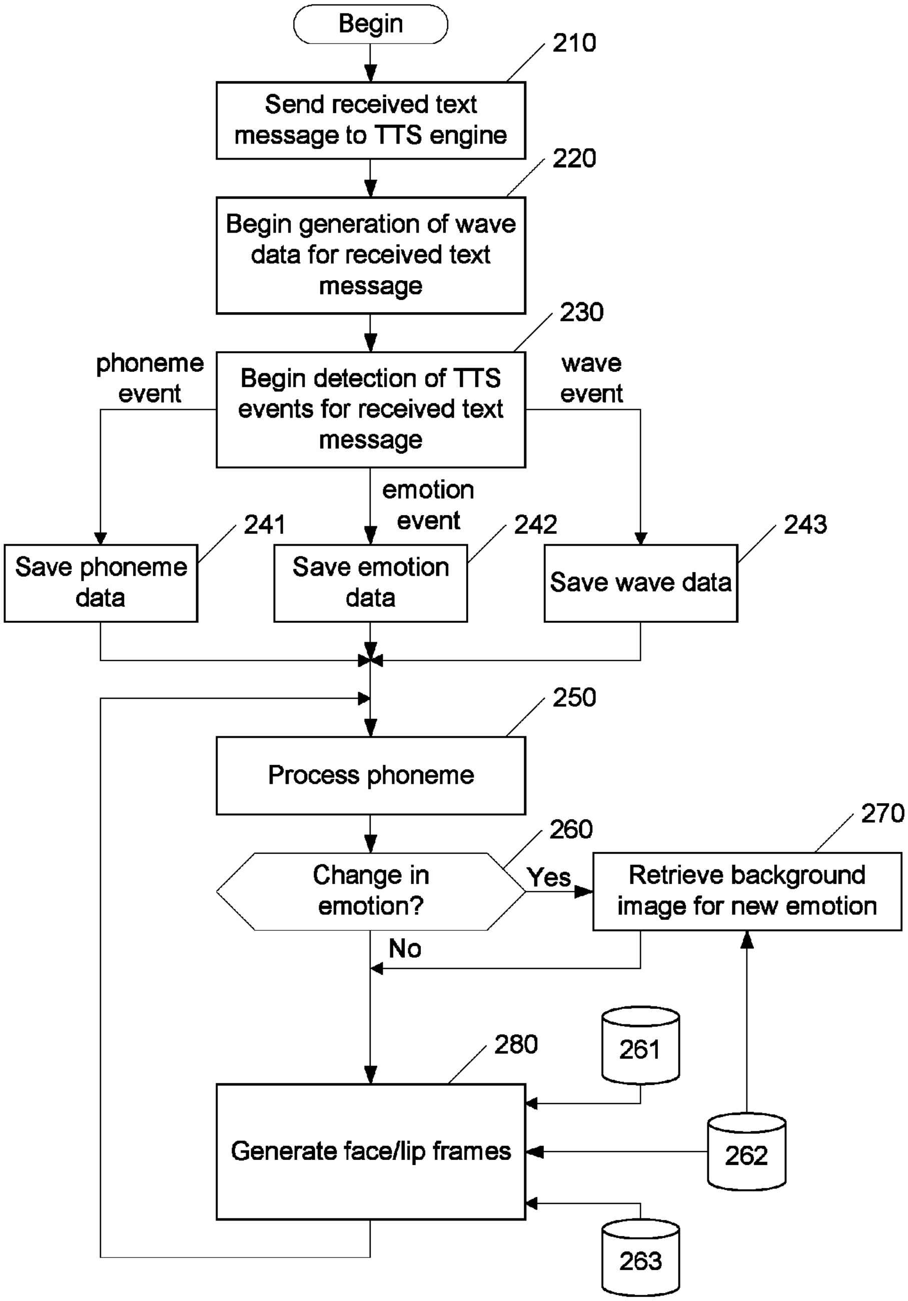
FIG. 2 is a flowchart of operations performed in generating animations as indicated in step 130 of FIG. 1.

Referring briefly to FIG. 2, in order to create animations, the animation generation component can employ 3 files: a mapping table 261, a phoneme bigram table 263 and a model file 262. The mapping table 261 is used to map phonemes to visemes. With the mapping table, the process of generating animations is the same for systems using different TTS engines. Only the mapping table needs to be modified for different TTS engines.

The animation generation component will be described in detail with reference to FIGS. 1, 2 & 4.

FIG. 1 depicts a flowchart of the overall image-based chat process. An IM system on a user device including an animation generation component implemented in accordance with the present invention generates animations when a message is received at a user device. Animations are not generated at the sender, which means that the user of a device implementing the present invention can still communicate with anyone, no matter what kind of IM system (image-based or text-based) the sender uses.

After the process begins at step 100, a default model file 262 is loaded at step. The model file 262 includes all face/lip frames for each viseme stored in the receiving system. When viseme data appears, the IM system generates animations according to the related frames in the model file 262. Basically, each viseme in the model file 262 can have 16 face/lip frames, based on an assumption that a human's persistence of vision is around 1/16 second. However, the number of frames is not limited to 16. In order to support different emotions, additional frames are needed to be added for different emotions. For example, if there is a plan to provide 20 visemes to support two emotions (anger and crying), the model file should contain (20×16×3) frames, in which the first (20×16)

frames are used for a default emotion, the next (20×16) frames are used for the anger emotion and the last (20×16) frames are used for the crying emotion.

Once the default model file is loaded, the system waits (step 120) for a message to be received. Once a message is received, animations are generated for that message in step 130. The animation generation process will be described in more detail with reference to FIG. 2. Finally, the animated message is displayed at step 140.

FIG. 2 is a flowchart of the animation generation process represented as step 130 in FIG. 1. At step 210, the received messages are sent to a conventional TTS engine that generates speech wave data (step 220).

At step 230, three TTS events are detected and registered; a phoneme event, a wave event and an index event. If a phoneme event is detected, the phoneme data is saved in step 241. If a wave event is detected, the wave data is saved in step 243. If an index event is detected, the status of the emotion is saved in step 242. Index events are derived from sender-specified HTML-like emotion tags (or emotion strings) included in a message. When the message is sent to the TTS engine, each emotion tag in the received message is replaced with an index, which lets the receiving system know when the sender intends a change in emotions. For example, when a user types the message "<angry>I am angry!</angry>", the system will insert an index at "<angry>" to indicate the sender wants to convey the emotion of anger and at "</angry>" to indicate the sender no longer once to convey that emotion.

As noted earlier, it is assumed that in the sender may want to convey three emotional states; default, anger and crying. Emotion tags indicating the sender wants to return to a default emotion may be implied, rather than explicit. If the message text contains an emotion tag indicating that the sender no longer wants to convey either anger or crying and that text is not followed by another explicit emotion tag, the system will return to the default state until a new explicit emotion tag is detected, This relieves the sender of the responsibility of inserting explicit "default emotion" tags, which reduces the data entry effort required of the sender and the amount of data that must be transmitted to the receiver. Steps 220 to step 243 are executed repeatedly until all text in the received message is processed.

The generation of animations begins when the TTS engine finishes the generation of wave data for the entire received message. Beginning at step 250, each phoneme is processed. A determination is made at step 260 as to whether an index event associated with the phoneme indicates the sender wants to convey a change in emotions. If no change in emotions is detected, face/lip frames are generated in step 280. If an intended change in emotion is detected, an new background image appropriate for the newly-selected emotion is retrieved from storage in step 270 in accordance with the model file 262 before proceeding to the generation of face/lip frames in step 280. The steps required for generating face/lip frames are described in more detail with reference to FIG. 4. Steps 250 to step 280 are executed repeatedly until all phonemes are processed.

Figure 3:
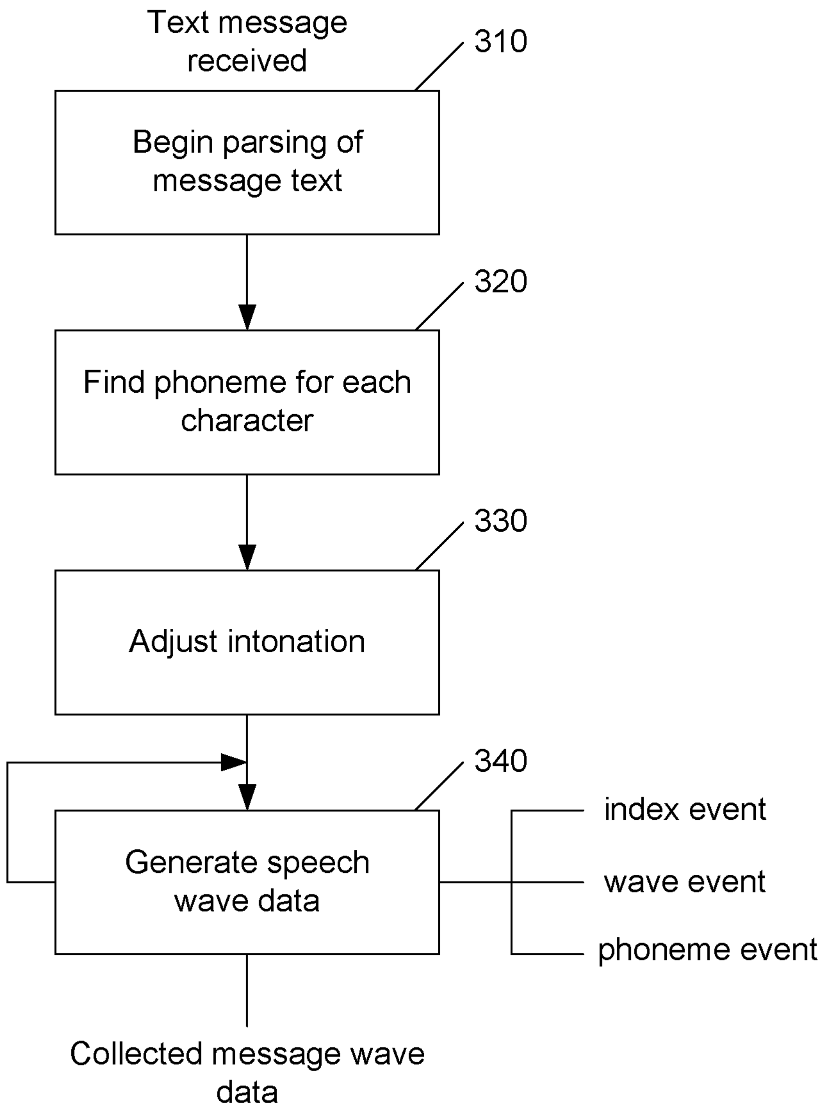
FIG. 3 is a flowchart of a TTS engine.

FIG. 3 is a general flowchart of a conventional TTS engine of the type required in performing step 220 in the process described (at least in part) above. Initially, the text of the inputted message is parsed in step 310. At step 320, phoneme data is generated for each character. Adjustment of intonation is performed at step 330 followed by generation of speech wave data in step 340. In the meantime, associated events (i.e., index, wave and phoneme) are detected and registered for use in the subsequent processes. The TTS engine accumulates generated speech wave data, sending it only after all text in the message is processed.

Figure 4:
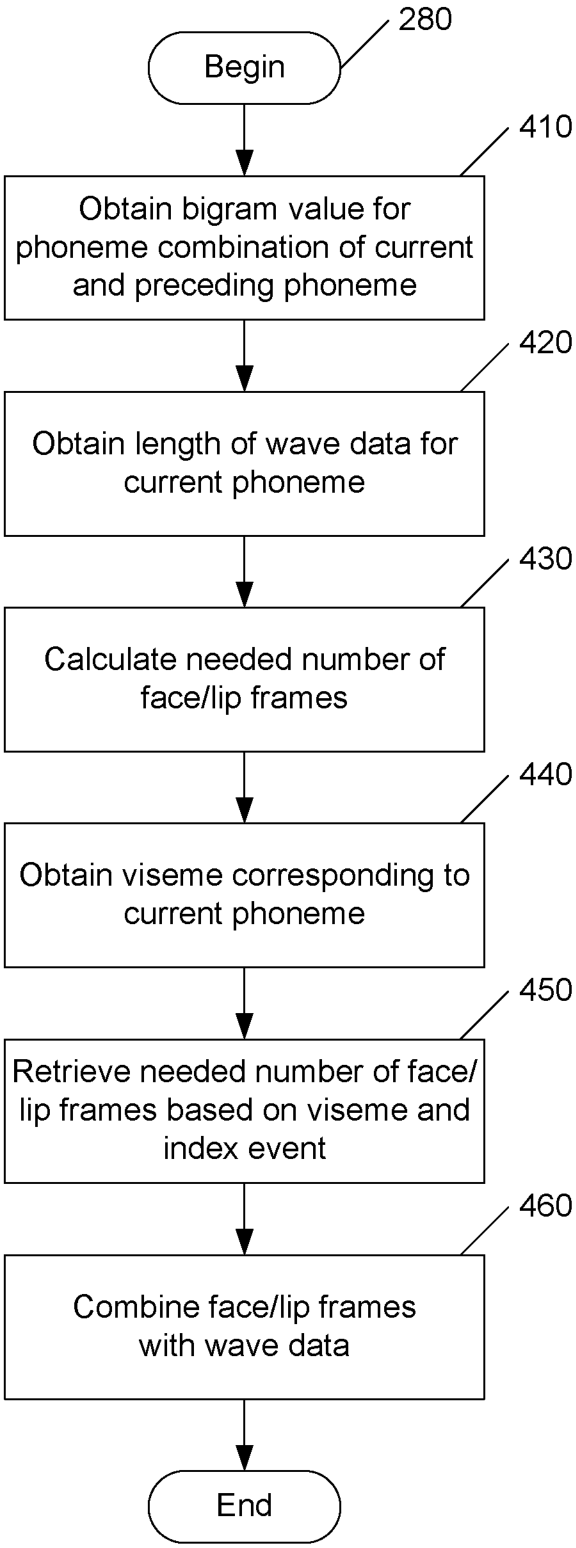
FIG. 4 is a flow chart of operations performed in generating face/lip frames for each phoneme as indicated at step 280 for each phoneme in FIG. 2.

FIG. 4 shows the steps of generating face/lip frames 280 for each phoneme. At step 410, a bigram value representing the frequency of the combination of the current phoneme and the preceding phoneme is obtained from the phoneme bigram table 263. The length of wave data of the phoneme is obtained at step 420. At step 430, the needed number of the face/lip frames is calculated according to the length of wave data. The viseme corresponding to the phoneme being processed is obtained from the phoneme/viseme mapping table 261 in step 440. In the following step 450, face/lip frames are retrieved with the number of frames be retrieved being determined by the viseme and any index event associated current phoneme. The retrieved face/lip frames are synchronized with the associated wave data in step 460 to generate the animations.

In practice, there is no need to retrieve all face/lip frames for each viseme in the model file when generating animations. Two factors are taken into account in determining how many frames are actually needed: the length of wave data of the current phoneme and the bigram value representing the frequency of the phoneme combination of the current phoneme and the preceding phoneme. As stated above, based on an assumption that normal human persistence of vision is around 1/16 second, there are 16 face/lip frames for each viseme in the model file 262. The number of face/lip frames actually needed for a viseme corresponding to a phoneme is equal to 16×T×B where T=the length of wave data of the current phoneme in seconds, and B=the bigram value for the combination of the current phoneme and the preceding phoneme.

If the length of wave data of the current phoneme is less than one second, and as mentioned above, the scope of the bigram value is (0.1, 1), the resulting number will be limited to be an integer within the range of 1 to 16.

The face/lip frames are obtained through the phoneme/viseme mapping table 261 and the model file 262. As depicted above, there are 16 frames defined for each viseme. If the result from the formula is 8, it means the number of the required frames for the viseme is only 8. Accordingly, 8 frames are extracted spread across the 16 frames of the viseme. For instance, the 16 frames may be divided into 8 sets with 2 frames in each set. If only eight frames are needed, the first frame of each set is extracted for use in conjunction with the audio wave data obtained by the TTS engine.

The phoneme bigram table is not necessarily required in implementing the present invention. The phoneme bigram table is used only to reduce the number of the frames required for animations and to optimize the smoothness of face/lip animations.

Figure 5:
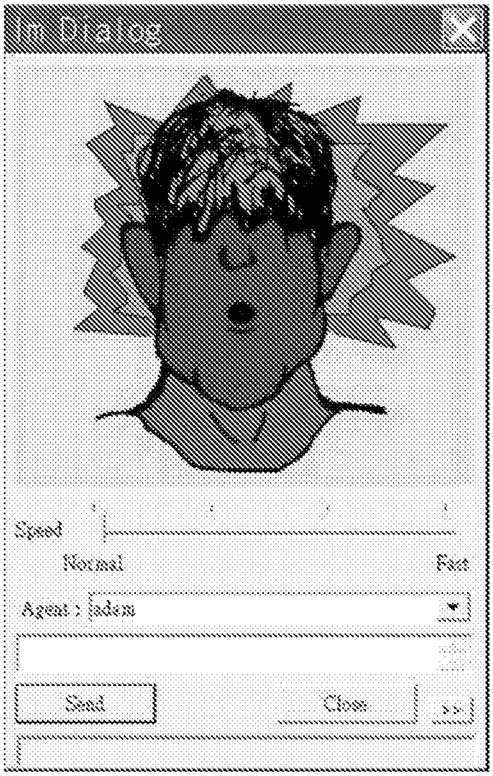
FIG. 5 is an example of a user interface for an IM system implemented in accordance with the present invention.

The end result of the process as described above can be characterized as a "talking head" representation of the sender appearing on the instant messaging user interface of the receiving user's device. FIG. 5 is an example of such a user interface. In use, the face and lip frames currently being shown would be synchronized with an audio message based on wave data with appropriate changes in the face and lip frames occurring throughout a message to visually express the emotions intended by the sender.

Figure 6:
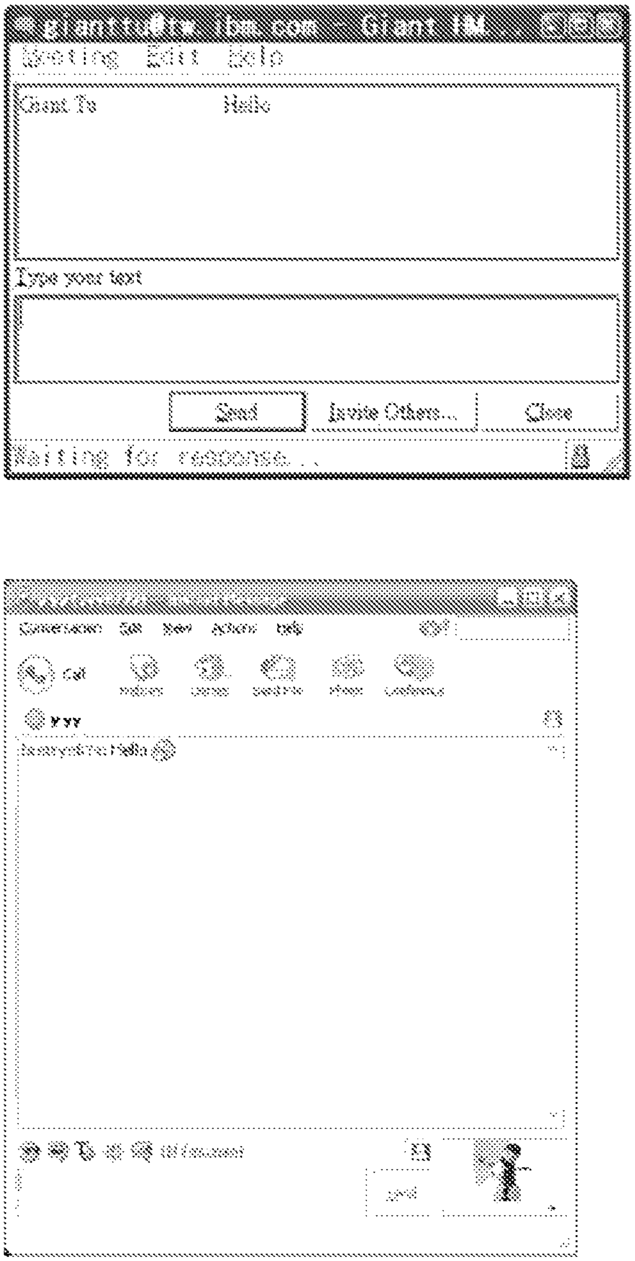
FIG 6. (prior art)
FIG. 6 shows examples of user interfaces for conventional text-based IM system.
Figure 7:
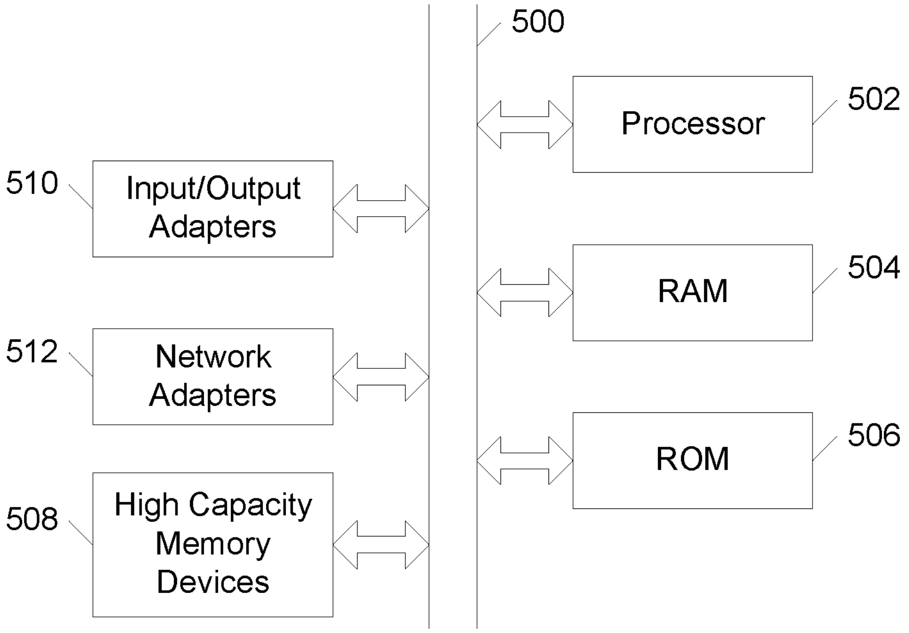
FIG. 7 is a block diagram of the hardware infrastructure of a general-purpose computer device that could be used to implement the present invention.

The visually expressive user interface shown in FIG. 5 can be contrasted to the more conventional IM user interfaces shown in FIG. 6.

Figure is a block diagram of a hardware infrastructure for a general-purpose computer device that could, when programmed properly, be used to implement the present invention. The infrastructure includes a system bus 500 that carries information and data among a plurality of hardware subsystems including a processor 502 used to execute program instructions received from computer applications running on the hardware. The infrastructure also includes random access memory (RAM) 504 that provides temporary storage for program instructions and data during execution of computer applications and are read only memory (ROM) 506 often used to store program instructions required for proper operation of the device itself, as opposed to execution of computer applications. Long-term storage of programs and data is provided by high-capacity memory devices 508, such as magnetic hard drives or optical CD or DVD drives.

In a typical computer system, a considerable number of input/output devices are connected to the system bus 500 through input/output adapters 510. Commonly used input/output devices include monitors, keyboards, pointing devices and printers. Increasingly, high capacity memory devices are being connected to the system through what might be described as general-purpose input/output adapters, such as USB or FireWire adapters. Finally, the system includes one or more network adapters 512 that are used to connect the system to other computer systems through intervening computer networks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of generating an animation using stored face/lip frames corresponding to a plurality of emotions to express emotion in connection with text message, the method comprising:

analyzing the text message to generate phoneme data and wave data based on content of the text message;

mapping generated phoneme data to viseme data representing a particular emotion based on information identifying the particular emotion, wherein the information is associated with the text message;

calculating a needed number of the stored face/lip frames associated with the viseme data based on a length of the generated wave data; and retrieving the calculated number of the stored face/lip frames to generate an animation associated with the generated wave data;

wherein the needed number of the face/lip frames is calculated as N×T×B, wherein N is a number of face/lip frames associated with the viseme data, T is a length of wave data of a current phoneme in seconds, and B is a bigram value corresponding to a frequency of a combination of the current phoneme and a preceding phoneme.

2. The method of claim 1, further comprising presenting the generated wave data and the retrieved face/lip frames to a user as synchronized audio/video data.

3. The method of claim 1, wherein the information identifying the particular emotion comprises at least one emotion tag embedded in the text message by a sender, and wherein analyzing the text message further comprises detecting the at least one emotion tag, each detected emotion tag representing the sender's intent to change the emotion being expressed in the message.

4. The method of claim 3, wherein face/lip frames to be retrieved are identified in the at least one emotion tag embedded in the text message.

5. The method of claim 1, wherein N=16.

6. A non-transitory computer readable medium having stored thereon computer usable program code for generating an animation using stored face/lip frames corresponding to a plurality of emotions to express emotion in connection with a text message, said computer usable program code comprising:

computer usable program code configured to analyze the text message to generate phoneme data and wave data based on content of the text message;

computer usable program code configured to map generated phoneme data to viseme data representing a particular emotion based on information identifying the particular emotion, wherein the information is associated with the text message;

computer usable program code configured to calculate a needed number of the stored face/lip frames associated with the viseme data based on a length of the generated wave data; and computer usable program code configured to retrieve the calculated number of the stored face/lip frames to generate an animation associated with the generated wave data;

wherein said computer usable program code configured to calculate the needed number of the face/lip frames is configured to calculate the needed number of the face/lip frames as N×T×B, wherein N is a number of face/lip frames associated with the viseme data, T is a length of wave data of a current phoneme in seconds, and B is a bigram value corresponding to a frequency of a combination of the current phoneme and a preceding phoneme.

7. The non-transitory computer readable medium of claim 6, further storing computer usable program code configured to present the generated wave data and the retrieved face/lip frames to a user as synchronized audio/video data.

8. The non-transitory computer readable medium of claim 6, wherein the information identifying the particular emotion comprises at least one emotion tag embedded in the text message by a sender, and wherein the computer usable program code configured to analyze the text message further comprises computer usable program code configured to detect the at least one emotion tag, each detected emotion tag representing the sender's intent to change the emotion being expressed in the message.

9. The non-transitory computer readable medium of claim 8, further storing computer usable program code configured to associate particular face/lip frames to be retrieved with the at least one detected emotion tag embedded in the text message.

10. The non-transitory computer readable medium of claim 6, wherein N=16.

11. A visual speech system for generating an animation using stored face/lip frames corresponding to a plurality of emotions to express emotion in connection with a text message, the system comprising: a processor; and at least one memory coupled to the processor, the at least one memory having stored thereon processor-executable instructions for:

analyzing the text message to generate phoneme data and wave data based on content of the text message;

mapping generated phoneme data to viseme data representing a particular emotion based on information identifying the particular emotion, wherein the information is associated with the text message;

calculating a needed number of the stored face/lip frames associated with the viseme data based on a length of the generated wave data; and retrieving the calculated number of the stored face/lip frames to generate an animation associated with the generated wave data;

wherein the processor-executable instructions for calculating the needed number of the face/lip frames calculate the needed number of the face/lip frames as N×T×B, wherein N is a number of face/lip frames associated with the viseme data, T is a length of wave data of a current phoneme in seconds, and B is a bigram value corresponding to a frequency of a combination of the current phoneme and a preceding phoneme.

12. The visual speech system of claim 11, further comprising a user interface for presenting the generated wave data and the retrieved face/lip frames to a user as synchronized audio/video data.

13. The visual speech system of claim 11, wherein the information identifying the particular emotion comprises at least one emotion tag, and the at least one memory further has stored thereon processor-executable instructions for:

detecting the at least one emotion tag embedded in the text message by a sender, each detected emotion tag representing the sender's intent to change the emotion being expressed in the message.

14. The visual speech system of claim 13, wherein face/lip frames to be retrieved are identified in the at least one emotion tag embedded in the text message.

* * * * *